United States Patent
Song et al.

(10) Patent No.: US 10,775,540 B2
(45) Date of Patent: Sep. 15, 2020

(54) METHOD OF FORMING LIGHT MODULATING SIGNAL FOR DISPLAYING 3D IMAGE, AND APPARATUS AND METHOD FOR DISPLAYING 3D IMAGE

(71) Applicant: SAMSUNG ELECTRONICS CO., LTD., Suwon-si (KR)

(72) Inventors: Hoon Song, Yongin-si (KR); Wontaek Seo, Yongin-si (KR); Hongseok Lee, Seongnam-si (KR); Juwon Seo, Osan-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 532 days.

(21) Appl. No.: 15/053,838

(22) Filed: Feb. 25, 2016

(65) Prior Publication Data
US 2016/0255338 A1   Sep. 1, 2016

(30) Foreign Application Priority Data
Feb. 26, 2015 (KR) .................. 10-2015-0027263

(51) Int. Cl.
*H04N 13/00* (2018.01)
*G02B 5/32* (2006.01)
(Continued)

(52) U.S. Cl.
CPC .............. *G02B 5/32* (2013.01); *G03H 1/08* (2013.01); *G03H 1/2286* (2013.01); *H04N 13/139* (2018.05); *H04N 13/302* (2018.05); *H04N 13/32* (2018.05); *H04N 13/354* (2018.05); *H04N 13/366* (2018.05); *H04N 13/398* (2018.05); *G03H 1/2294* (2013.01); *G03H 2001/0825* (2013.01); *G03H 2001/2242* (2013.01); *G03H 2222/34* (2013.01);
(Continued)

(58) Field of Classification Search
None
See application file for complete search history.

(56) References Cited

U.S. PATENT DOCUMENTS 7,425,069 B2   9/2008  Schwerdtner et al.
7,636,184 B2  12/2009  Schwerdtner
(Continued)

FOREIGN PATENT DOCUMENTS

DE   10 2009 044 910 A1   12/2010
KR   10-2012-0045269 A     5/2012
(Continued)

OTHER PUBLICATIONS

Takaki, Yasuhiro et al., "Super multi-view display with a lower resolution flat-panel display", OPTICS EXPRESS, vol. 19, No. 5, Feb. 16, 2011, 11 pages total pp. 4129-4139.
(Continued)

*Primary Examiner* — Sath V Perungavoor
*Assistant Examiner* — Tyler B Edwards
(74) *Attorney, Agent, or Firm* — Sughrue Mion, PLLC

(57) ABSTRACT

A method of forming a light modulating signal for displaying a 3D includes preparing a plurality of data sets for 2D image data with different viewpoints; imposing a phase value the plurality of data sets, by which each of the 2D images is seen at a corresponding viewpoint; and superposing the 2D images.

29 Claims, 13 Drawing Sheets

(51) Int. Cl.
*G03H 1/22* (2006.01)
*G03H 1/08* (2006.01)
*H04N 13/139* (2018.01)
*H04N 13/302* (2018.01)
*H04N 13/32* (2018.01)
*H04N 13/398* (2018.01)
*H04N 13/366* (2018.01)
*H04N 13/354* (2018.01)
*H04N 13/305* (2018.01)
*H04N 13/376* (2018.01)

(52) U.S. Cl.
CPC ..... *G03H 2223/16* (2013.01); *G03H 2223/17* (2013.01); *G03H 2223/19* (2013.01); *G03H 2226/05* (2013.01); *H04N 13/305* (2018.05); *H04N 13/376* (2018.05); *H04N 2213/001* (2013.01)

(56) References Cited

U.S. PATENT DOCUMENTS

| | | | |
|---|---|---|---|
| 7,839,548 | B2 | 11/2010 | Schwerdtner |
| 8,218,211 | B2* | 7/2012 | Kroll ............... G03H 1/02 359/32 |
| 8,279,325 | B2* | 10/2012 | Pitts ............... H04N 5/23212 348/345 |
| 8,379,079 | B2 | 2/2013 | Kroll et al. |
| 9,036,246 | B2 | 5/2015 | Song et al. |
| 9,360,840 | B2 | 6/2016 | Won et al. |
| 2010/0033781 | A1 | 2/2010 | Leister |
| 2010/0195178 | A1 | 8/2010 | Leister et al. |
| 2010/0289870 | A1 | 11/2010 | Leister |
| 2011/0157667 | A1* | 6/2011 | Lacoste ............ G03H 1/2205 359/9 |
| 2012/0086994 | A1* | 4/2012 | Choi ............... G03H 1/2294 359/9 |
| 2012/0092735 | A1 | 4/2012 | Futterer et al. |
| 2012/0176665 | A1 | 7/2012 | Song et al. |
| 2013/0335795 | A1 | 12/2013 | Song et al. |
| 2014/0055692 | A1 | 2/2014 | Kroll et al. |
| 2014/0210960 | A1 | 7/2014 | Sung et al. |
| 2014/0285862 | A1 | 9/2014 | Song et al. |
| 2015/0205262 | A1 | 7/2015 | Won et al. |
| 2015/0293497 | A1 | 10/2015 | Song et al. |
| 2016/0011565 | A1 | 1/2016 | Sung et al. |
| 2016/0041524 | A1 | 2/2016 | Song et al. |
| 2016/0255338 | A1 | 9/2016 | Song et al. |

FOREIGN PATENT DOCUMENTS

| | | |
|---|---|---|
| KR | 10-1391889 B1 | 5/2014 |
| KR | 10-2016-0104363 A | 9/2016 |
| WO | 2004/051323 A1 | 6/2004 |

OTHER PUBLICATIONS

Kajiki, Yoshihiro et al., "Autostereoscopic 3-D Video Display Using Multiple Light Beams with Scanning", IEEE Transactions on Circuits and Systems for Video Technology, vol. 10, No. 2, Mar. 2000, pp. 254-260.

Takaki, Yasuhiro, "Prospective Novel 3D Display Technology Development", Tokyo University of Agriculture and Technology, 3DSA2012, 51 pages total (2012).

Takaki, Yasuhiro, "Next Generation and Ultimate 3D Display", Tokyo University of Agriculture and Technology, iMiD/IDMC/Asia Display 2010, 33 pages total (2010).

Takaki, Yasuhiro, "Prospective Novel 3D Display Technology Development", Tokyo University of Agriculture and Technology, 3DSA2012, Announced on Jun. 25-27, 2012, 51 pages total.

Takaki, Yasuhiro, "Next Generation and Ultimate 3D Display", Tokyo University of Agriculture and Technology, iMiD/IDMC/Asia Display 2010, Announced on Oct. 10-15, 2010, 33 pages total.

* cited by examiner

METHOD OF FORMING LIGHT MODULATING SIGNAL FOR DISPLAYING 3D IMAGE, AND APPARATUS AND METHOD FOR DISPLAYING 3D IMAGE

CROSS-REFERENCE TO RELATED APPLICATION

This application claims priority from Korean Patent Application No. 10-2015-0027263, filed on Feb. 26, 2015, in the Korean Intellectual Property Office, the disclosure of which is incorporated herein in its entirety by reference.

BACKGROUND

1. Field

Apparatuses and methods consistent with exemplary embodiments relate to displaying a three-dimensional (3D) image.

2. Description of the Related Art

A glasses system and a glassesless system have been widely commercialized and used as methods of realizing a 3D image. The glasses system includes a polarization glasses system and a shutter glasses system, and the glassesless system includes a lenticular system and a parallax barrier system. Such systems use a binocular parallax between the eyes, and, thus, there is a problem in that there is a limit in a number of viewpoints, and further a viewer may feel fatigued due to a mismatch between a depth appreciated in the brain and an eye focus. Thus, when a user focuses the eyes on a screen, the user can see the screen with a good resolution and contrast but may feel fatigued due to a mismatch between a recognition position and the eye focus. Meanwhile, when the user focuses the eyes on a recognition position, the user cannot accurately see the screen due to a blurred screen.

Recently, research with respect to a multi-view type 3D display or a holographic 3D display has been performed to reduce the feeling of the fatigue.

The multi-view type 3D display provides 3D images with different viewpoints to a plurality of visual fields, respectively. The number of viewpoints may be increased to provide a natural motion parallax, and as a result, a resolution of unit viewpoint may be decreased.

The holographic 3D display provides a full parallax in which the depth appreciated in the brain and the eye focus are matched. The holographic display system uses a principle of reproducing an original object image when a hologram pattern is irradiated with the reference light and diffracted in which an interference fringe obtained by interfering object light reflected from an original object and a reference light is recorded. The holographic display system which has been put to practical use would provide a computer generated hologram (CGH) toward a space light modulator as an electrical signal rather than obtain the hologram pattern by directly exposing the original object. The space light modulator forms the hologram pattern according to the input CGH signal and diffracts the reference light, to thereby generate a 3D image. However, a space light modulator with very high resolution and a great amount of data processing are needed to realize a good holographic display system.

SUMMARY

Exemplary embodiments address at least the above problems and/or disadvantages and other disadvantages not described above. Also, the exemplary embodiments are not required to overcome the disadvantages described above, and may not overcome any of the problems described above.

One or more exemplary embodiments provide methods and apparatuses for forming a light modulating signal for displaying a 3D image, and displaying the 3D image.

According to an aspect of an exemplary embodiment, a method of forming a light modulating signal for displaying a 3D image includes preparing a plurality of data sets regarding two-dimensional (2D) image data with different viewpoints; determining a phase value with respect to each of the 2D images, by which each of the 2D images is seen at a corresponding viewpoint; imposing a predetermined phase value to each of the plurality of data sets regarding 2D images, and superposing the plurality of data sets regarding 2D images on which the phase value has been imposed; and converting a complex function value obtained from the superposing into an operating signal for a space light modulator.

The preparing the plurality of data sets regarding 2D images may include conversion of format of 3D image data.

The preparing the plurality of data sets regarding 2D images may include capturing the 2D images with different viewpoints by using cameras.

The preparing the plurality of data sets regarding 2D images may include converting light field data.

The preparing the plurality of data sets regarding 2D images and the determining the phase value may provide at least two 2D images with different viewpoints to a pupil of a viewer.

The determining the phase value may use data calculated and stored in advance with respect to various positions of a viewer's pupil.

According to an aspect of an exemplary embodiment, a method of displaying a 3D image includes emitting a convergent coherent light toward a space light modulator; forming a light modulating signal for displaying the 3D image according to the above-described method; and modulating light incident to the space light modulator according to the light modulating signal.

The preparing the plurality of data sets regarding 2D images may include conversion of format of 3D image data.

The preparing the plurality of data sets regarding 2D images may include capturing the 2D images with different viewpoints by using cameras.

The preparing the plurality of data sets regarding 2D images may include converting light field data.

The preparing the plurality of data sets regarding 2D images and the determining the phase value may provide at least two 2D images with different viewpoints to a pupil of a viewer.

The method of displaying the 3D image may further include eye tracking configured to sense a position of a viewer's pupil.

The determining the phase value may use data calculated and stored in advance with respect to various positions of the viewer's pupil.

The emitting the convergent coherent light may adjust a direction along which the light is emitted such that the light is converged toward the sensed position of the viewer's pupil.

The eye tracking may sense positions of left and right eyes of a viewer; and the emitting the convergent coherent light may adjust a direction along which the light is emitted such that the light is converged toward the left and right eyes of the viewer based on a time division method.

According to an aspect of another exemplary embodiment, a method of forming a light modulating signal for displaying a 3D image may include preparing a plurality of data sets regarding 2D images with different depth cues; imposing a phase value to each of the plurality of data sets regarding 2D images, by which each of the 2D images is seen at a position of a viewer's pupil; determining a conversion function by which the 2D image are provided at plurality of positions in the viewer's pupil, applying the conversion function to the plurality of data sets, and superposing the plurality of data sets to which the conversion function has been applied; and converting a complex function value obtained from the superposing into an operating signal for a space light modulator.

According to an aspect of another exemplary embodiment, an apparatus for displaying a 3D image may include a backlight unit configured to emit a convergent coherent light; a space light modulator configured to modulate the light emitted from the backlight unit; a light modulating signal generator configured to generate a light modulating signal for displaying a 3D image according to the above-described method; and a controller configured to control the space light modulator according to the light modulating signal.

The apparatus for displaying a 3D image may further include an eye tracker configured to sense positions of left and right eyes of a viewer.

A converging direction of light emitted from the backlight unit may be adjusted according to the positions of the left and right eyes of the viewer.

The light modulating signal generator may generate a light modulating signal for odd-numbered frames and a light modulating signal for even-numbered frames; and the controller may control the space light modulator to modulate light according to the light modulating signal for the odd-numbered frames and the light modulating signal for the even-numbered frames based on a time division method, and may control the backlight unit such that the light output from the backlight unit is converged toward the left and right eyes of the viewer, in synchronization with the space light modulator.

The backlight unit may include first and second light sources configured to output light in different directions and adjust output directions; and an optical lens configured to converge the light output from the first and second light sources.

The backlight unit may include a light source; a light guiding member configured to include an incident surface on which light emitted from the light source is incident, a first surface from which the incident light is emitted, and a second surface facing the first surface; at least one optical element configured to converge light; and a beam steering element disposed between the light source and the incident surface of the light guiding member and adjust an angle at which the light emitted from the light source is incident on the incident surface.

An output pattern emitting light from the light guiding member may be formed on the first surface or the second surface.

The at least one optical element may be a hologram optical element disposed on the first surface, the hologram optical element being configured to emit light incident to the light guiding member in a form of convergent light.

The light guiding member is wedge shaped and a distance between the first and second surfaces is narrower farther from the light source unit, and may further include an inverted-prism sheet disposed on the first surface; a variable optical element disposed on the inverted-prism sheet; and an optical lens disposed on the variable optical element.

The space light modulator may be an amplitude modulation type space light modulator; and the controller may generate the light modulating signal by using a real part of a complex function value.

BRIEF DESCRIPTION OF THE DRAWINGS

The above and/or other aspects will become more apparent by describing certain exemplary embodiments with reference to the accompanying drawings, in which.

DETAILED DESCRIPTION

Figure 1:
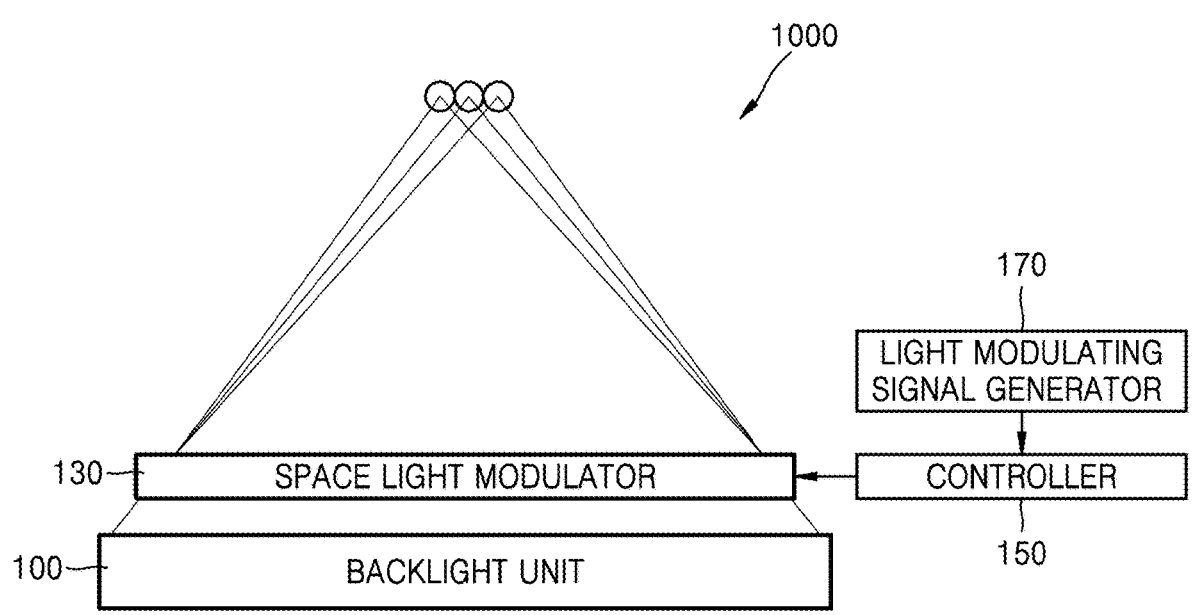
FIG. 1 is a sectional view of a schematic structure of a 3D image display apparatus according to an exemplary embodiment.

Certain exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments may be practiced without those specifically defined matters. Also, well-known functions or constructions are not described in detail since they would obscure the description with unnecessary detail.

As used herein, the term "and/or" includes any and all combinations of one or more of the associated listed items. Expressions such as "at least one of," when preceding a list of elements, modify the entire list of elements and do not modify the individual elements of the list.

Figure 2:
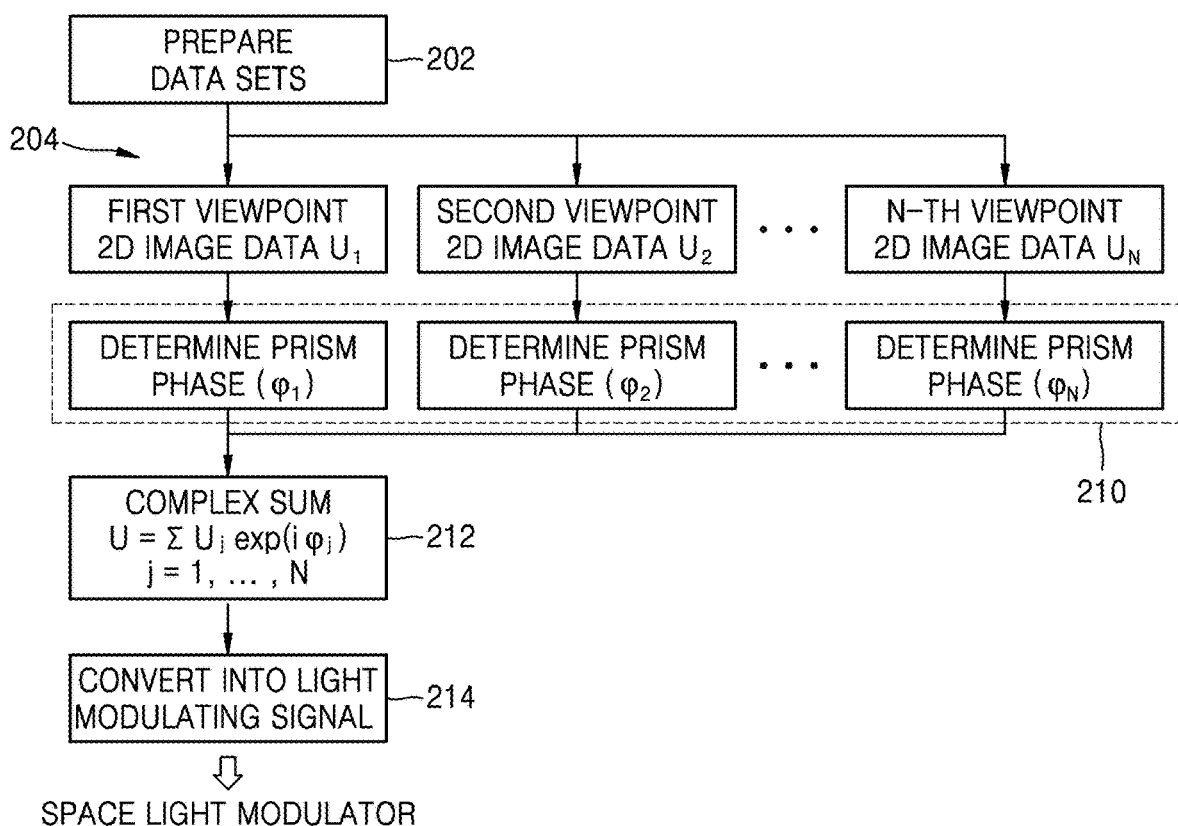
FIG. 2 is a flow chart schematically illustrating a process of forming a light modulating signal to be provided toward a space light modulator.
Figure 3:
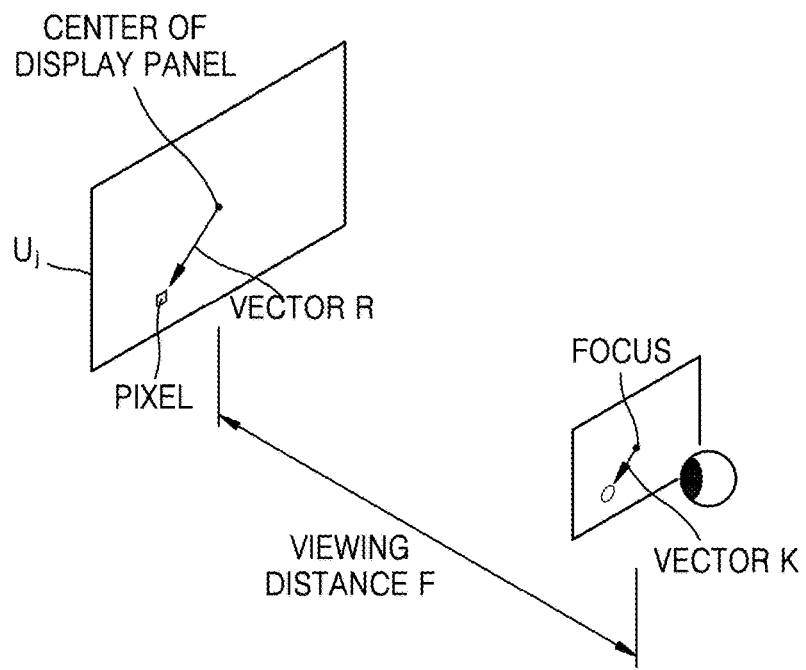
FIG. 3 is a schematic view of a method of obtaining prism phases to be provided to each of a plurality of data sets regarding 2D image data with different viewpoints.

FIG. 1 is a sectional view of a schematic structure of a 3D image display apparatus 1000 according to an exemplary embodiment. FIG. 2 is a flow chart schematically illustrating a process of forming a light modulating signal to be provided toward a space light modulator (SLM) 130 in a light modulating signal generator 170 of the 3D image display apparatus 1000 of FIG. 1. FIG. 3 is a schematic view of a method of obtaining prism phases to be applied to each of a plurality set of data regarding 2D image data with different viewpoints. The 3D image display apparatus 1000 may include a backlight unit 100 and a space light modulator 130 modulating light from the backlight unit 100.

The 3D image display apparatus 1000 displays a plurality of images with different viewpoints on a visual field of a viewer and provides a stereoscopic effect. In forming the images with different viewpoints, the 3D image display apparatus 1000 according to an exemplary embodiment may provide the space light modulator 130 with the light modulating signal by which at least two images are superposed and displayed on a screen, thereby using the full resolution of the space light modulator 130 and displaying a 3D image.

A controller 150 may control the space light modulator 130 according to the light modulating signal formed in the light modulating signal generator 170. The light modulating signal transmitted from the controller 150 is a signal superposing and displaying at least two images with different viewpoints. When a coherent light is incident from the backlight unit 100 to the space light modulator 130, the superposed images with different viewpoints are separated in the directions facing corresponding viewpoints by diffraction. The images with different viewpoints may be formed in a region that is smaller than the size of the pupil in a viewer's single eye, and thus the viewer may experience the stereoscopic effect only with the single eye. FIG. 1 illustrates that the image is provided to three viewpoint positions. However, an exemplary embodiment is not limited thereto, and any number of viewpoint positions of two or greater may be used.

The backlight unit 100 may have various configurations capable of emitting a convergent coherent light. For example, the backlight unit 100 may include a light source and at least one convergent optical element. As the light incident from the backlight unit 100 to the space light modulator 130 is diffracted and modulated, and separates the superposed images into corresponding viewpoints, a laser light source having high coherence may be adapted in the backlight unit 100. A light emitting diode (LED) may be adapted as a light source having spatial coherence. In addition, a pin hole configuration or a lens may be used to control the light of the light source so that a spatial coherence may be improved. The pin hole configuration is known to those skilled in the art and, therefore, a detailed description is omitted. Furthermore, various light sources having good spatial coherence or optical devices capable of improving spatial coherence of the light source may be used by the configuration.

The space light modulator 130 may include at least one of a phase modulator performing only phase modulation, an amplitude modulator performing only amplitude modulation, and a combined modulator performing both phase modulation and amplitude modulation. Furthermore, FIG. 1 illustrates the space light modulator 130 as a transmission type light modulator but is not limited thereto, and a reflection type space light modulator may also be used. If the space light modulator 130 is a transmission type, a semiconductor modulator or a liquid crystal device (LCD) based on a compound semiconductor such as GaAs may be used. If the space light modulator 130 is a reflection type, as for example, a digital micromirror device (DMD), a liquid crystal on silicon (LcoS) or a semiconductor modulator may be used.

The light modulating signal generator 170 may form a light modulating signal for displaying a 3D image.

By referring to FIG. 2, a light modulating signal forming method of displaying a 3D image, which is performed in the light modulating signal generator 170, will be described.

First, a plurality of data sets regarding 2D image data with different viewpoints is generated (operation 202). The plurality of data sets regarding 2D image data with different viewpoints may be obtained by various methods, as for example, by converting the format of a 3D image data. The 3D image data may be 3D model data, 3D computer graphic data, or color-depth data. The 3D image data may be data obtained by using a 3D camera. A plurality of data sets regarding 2D image data with different viewpoints may be obtained by converting light field data obtained by using a light field camera.

Furthermore, the plurality set of data regarding 2D image data with different viewpoints $U_1$ to $U_N$ may be directly obtained by using a plurality of cameras (for example, N cameras).

For example, a plurality of data sets 204 regarding 2D images $U_1$ and $U_2$ to $U_N$ having a first viewpoint and second to an Nth viewpoint, e.g., a first viewpoint and second to an Nth viewpoint 2D image data, may be prepared. The 2D images are to be provided to different viewpoint positions within a pupil and 3D images may be viewed when those images are combined.

Hereinafter, $U_j$ represents 'a data set regarding 2D image' and may be abbreviated as '2D image data'. Furthermore, $U_j$ may also represent an image displayed by 2D image data for convenience of explanation.

Next, respective directions in which each of the 2D images is to be directed may be determined, for example, by calculating a prism phase for each direction (operation 210). For example, a phase value by which each of the 2D images is seen at a corresponding viewpoint may be determined. The phase may be represented as a prism phase. By using a principle that the direction of light passing through a prism is changed according to an angle formed by a prism surface, a prism phase corresponding to each of the first viewpoint to an Nth viewpoint 2D images $U_1$ to $U_N$ may be imposed on corresponding 2D images so that the images with different viewpoints may be focused on corresponding viewpoints. A prism phase $\varphi_j$ corresponding to the 2D image data $U_j$ may be represented as $\exp(i\varphi_j)$, which is a complex function. A process for imposing the prism phase $\varphi_j$ to the corresponding 2D image data $U_j$ may be formed by operation such as $U_j \exp(i\varphi_j)$.

In operation 212, the 2D image data $U_j$ on which the prism phase $\varphi_j$ is imposed may be superposed or combined as follows:

$$U = \sum_j U_j \exp(i\varphi_j)$$

Referring to FIG. 3, the prism phase $\varphi_j$ corresponding to the 2D image data $U_j$ may be determined as follows:

$$\varphi_j = \frac{2\pi}{\lambda} \cdot \frac{\vec{R} \cdot \vec{K}}{F}$$

where F is a viewing distance, that is, a focal distance,

R is a vector toward each pixel from a center of a display panel,

K is a vector toward a viewing position from a focal position on a focal plane, and λ is a wavelength of light transmitting corresponding pixel.

Superposed image data U may have a complex function value and converted into an operating signal, e.g., a light modulating signal, to be output to the space light modulator 130, in operation 214. For example, the superposed image data U is digitized according to the number of pixels of the space light modulator 130 and converted into a control signal to be applied to each pixel. A processing method of the complex function value may be changed according to the type of the space light modulator 130. For example, when the space light modulator 130 is an amplitude modulation type, a real part of the complex function may be used.

A signal generated from the light modulating signal generator 170 may be applied to the space light modulator 130 through the controller 150. Light emitted from the backlight unit 100 may be diffracted and modulated by passing through the space light modulator 130 in which the control signal is applied, and may form images with different viewpoints in a viewer's visual field. Thus, a 3D image may be recognized by the viewer.

Figure 4:
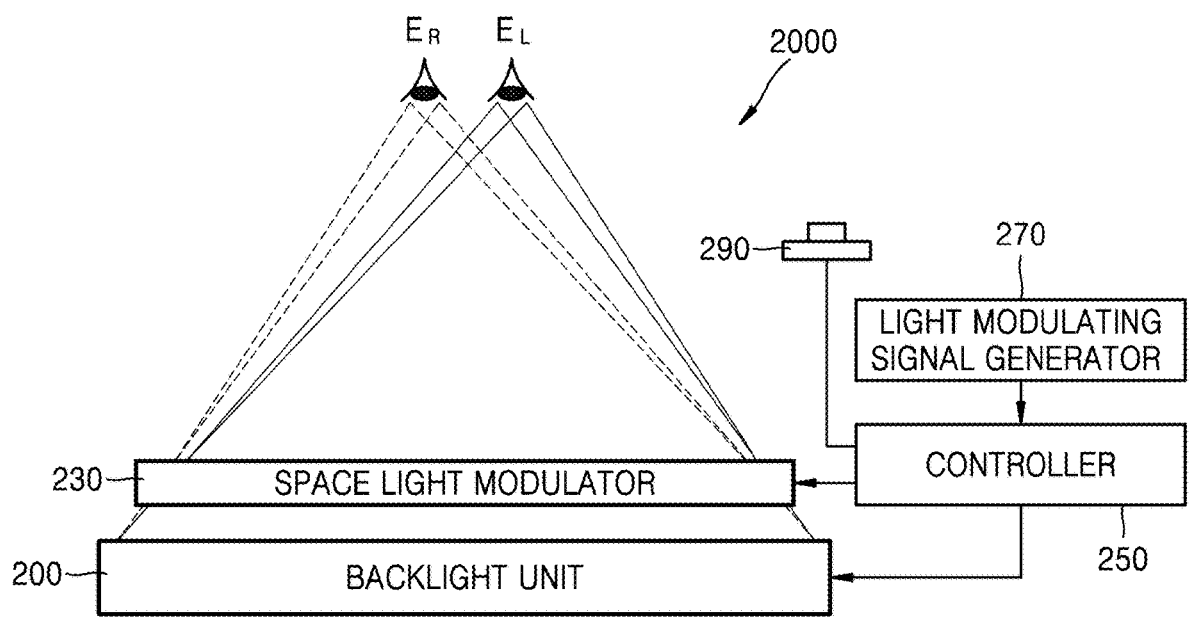
FIG. 4 is a sectional view of a schematic structure of a 3D image display apparatus according to an exemplary embodiment.
Figure 5:
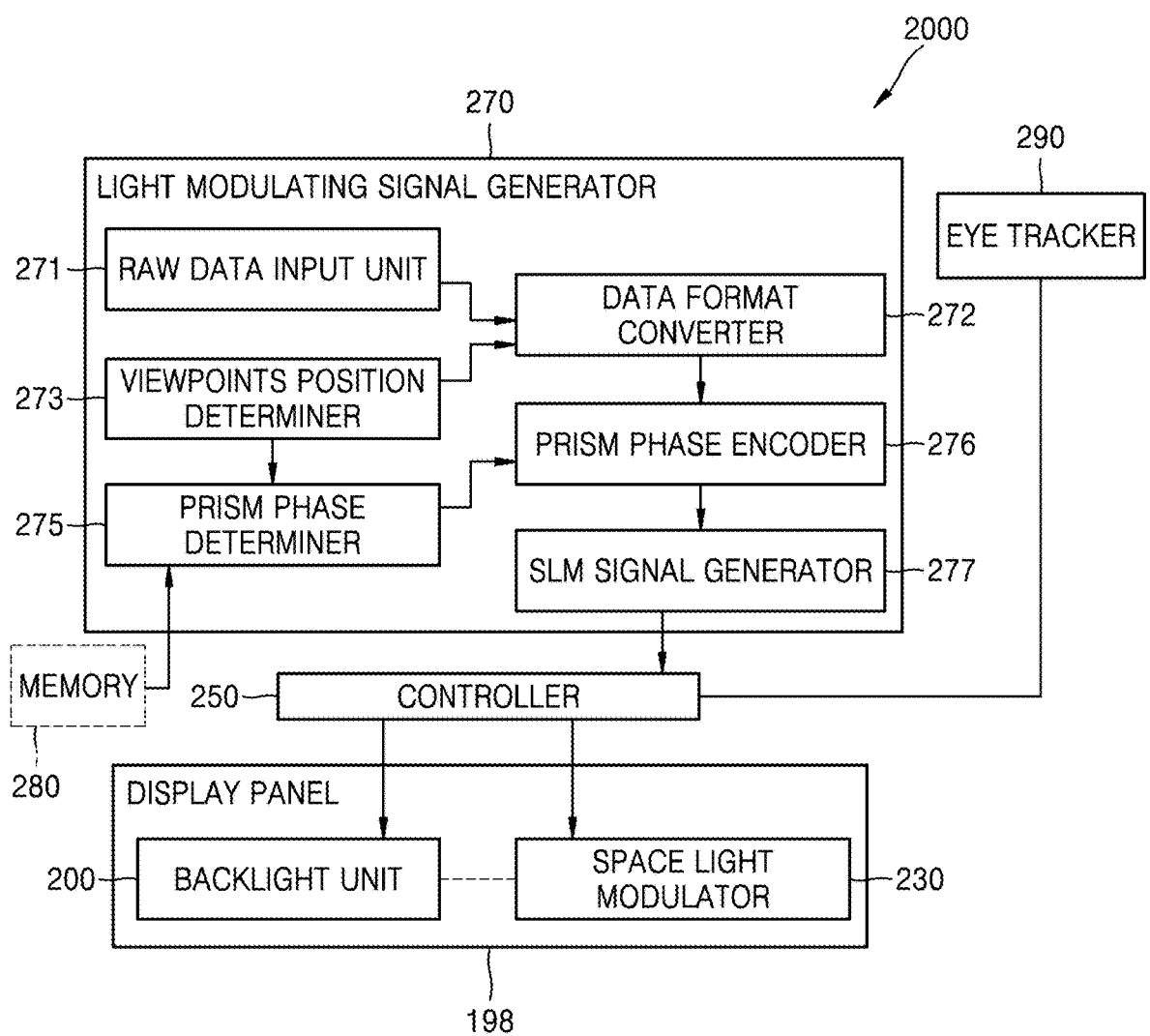
FIG. 5 is a block diagram of a schematic structure of the 3D image display apparatus.
Figure 6:
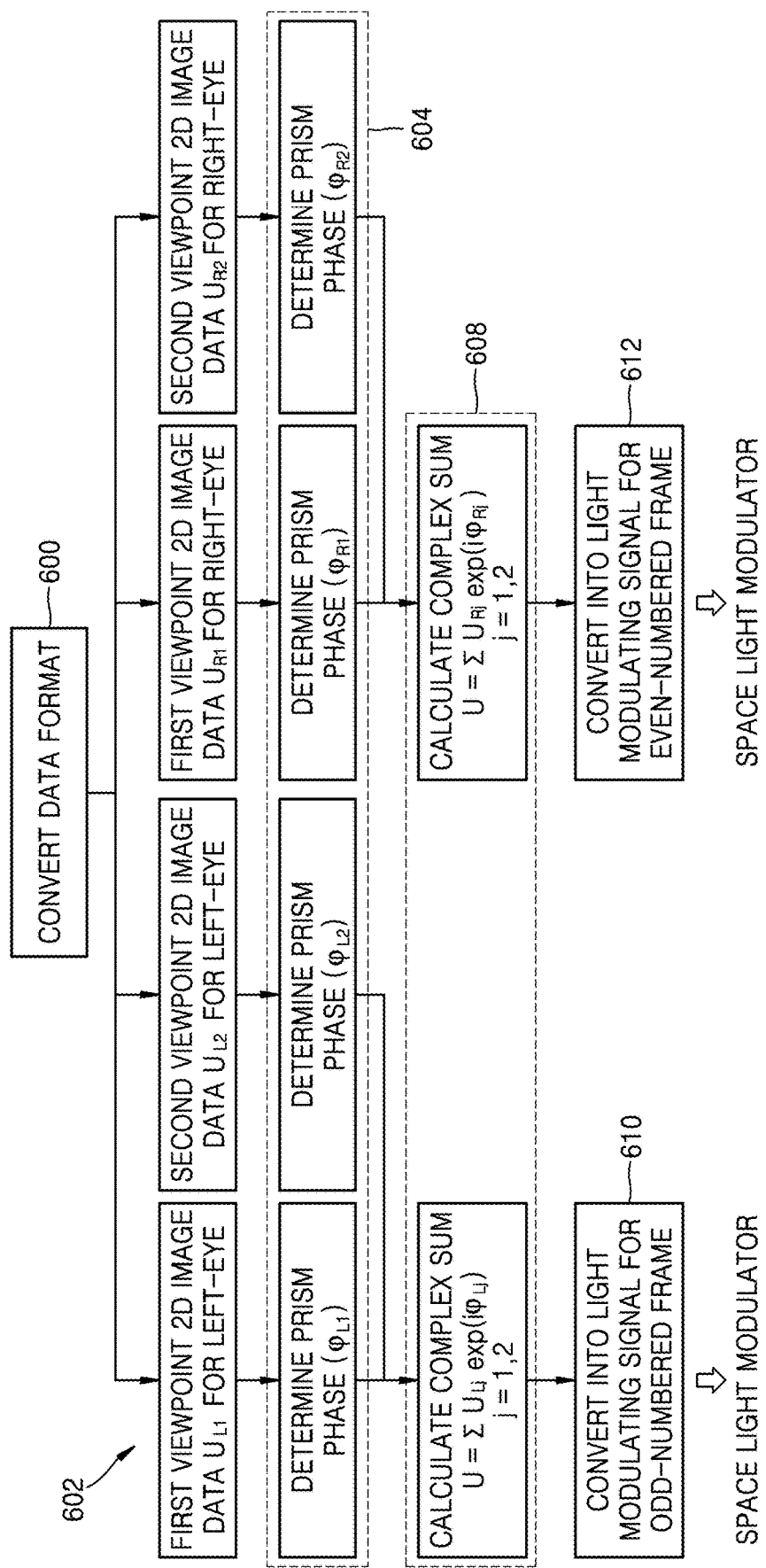
FIG. 6 is a flow chart schematically illustrating a process of forming a light modulating signal to be provided toward a space light modulator.

FIG. 4 is a sectional view of a schematic structure of a 3D image display apparatus 2000 according to an exemplary embodiment. FIG. 5 is a block diagram of a schematic structure of the 3D image display apparatus 2000 of FIG. 4. FIG. 6 is a flow chart schematically illustrating a process of forming a light modulating signal to be provided toward a space light modulator 230 in a light modulating signal generator 270 of the three-dimensional image display apparatus 2000 of FIG. 4.

Referring to FIGS. 4 and 5, the 3D image display apparatus 2000 may include a display panel 198, a backlight unit 200, the space light modulator 230, an eye tracker 290, the light modulating signal generator 270, and a controller 250.

The backlight unit 200 may emit and provide a convergent coherent light to the space light modulator 230, and may include a coherent light source, and at least one convergent optical element. The backlight unit 200 may include a configuration such as a pin hole capable of improving coherence. The backlight unit 200 may have a configuration in which a light output direction is adjusted so that an output light may be focused on positions of left and right eyes of a viewer analyzed by the eye tracker 290. For example, a light output direction of the backlight unit 200 may be adjusted in a left-eye position and a right-eye position by the controller 250.

The space light modulator 230 may use any one from among a phase modulator performing only phase modulation, an amplitude modulator performing only amplitude modulation, and a combined modulator performing both phase modulation and amplitude modulation. Furthermore, FIG. 4 illustrates the space light modulator 230 as a transmission type light modulator but is not limited thereto, a reflection type space light modulator is also available. If the space light modulator 230 is a transmission type, a semiconductor modulator based on a compound semiconductor such as GaAs or a LCD may be used. If the space light modulator 230 is a reflection type, for example, a DMD, a LcoS, or a semiconductor modulator may be used.

The eye tracker 290 senses a position of the viewer's pupil, and may include an infrared camera, a visible ray camera, or other various sensors. For example, the eye tracker 290 may obtain an image of the viewer by a camera and so on, and may detect a pupil of the viewer in the image and analyze a position of the viewer's pupil. The position of the pupil may be predicted when the pupil of the viewer is not found due to eye flickering or an obstacle, and a movement of the pupil position may be predicted according to a movement of the viewer. The eye tracker 290 may track a position of the viewer's pupil change in real time and provide the result to the controller 250. The controller 250 may provide the light modulating signal generator 270 with the pupil position determined by the eye tracker 290, for a light modulating signal generation. The controller 250 may control the light output direction in the backlight unit 200 to be focused on the pupil position determined by the eye tracker 290.

The light modulating signal generator 270 may generate a light modulating signal for displaying the 3D image to operate the space light modulator 230 and transmit to the controller 250.

For example, the light modulating signal generator 270 may include a raw data input unit 271, a viewpoints position determiner 273, a prism phase determiner 275, a data format converter 272, a prism phase encoder 276, and an SLM signal generator 277 for the SLM.

Raw data input to the raw data input unit 271 may include 3D image data having various formats. For example, 3D model data, 3D computer graphic data, etc., may be input as the 3D image data. Various types of data capable of displaying a 3D image such as a stereoscopic 3D image signal, or color-depth data obtained by using a 3D camera may be input. Furthermore, light field data obtained by using a light field camera may be input. The raw input data may be input from a storage, memory, or a server, or may be input as a live feed, e.g., from a camera.

A format of the input data may be converted by the data format converter 272. For example, the input data may be converted into image data with different viewpoints for a left eye and image data with different viewpoints for a right eye as a plurality of data sets regarding 2D image data with different viewpoints.

In order to convert the data format, the viewpoints position determiner 273 may determine viewpoint positions of images to be input to the pupil of the viewer based on the position of the pupil sensed by the eye tracker 290, and may transmit to the data format converter 272.

Considering the determined viewpoint positions, the data format converter 272 may convert the data format by using an operation processing method suitable for each type of the input image data. For example, the data may be converted into a plurality of data sets regarding directional images. The directional image signals may be a plurality of data sets regarding 2D image data with different viewpoints, for example, image data with different viewpoints for a left eye and image data with different viewpoints for a right eye. The image data with different viewpoints for the left eye may be first viewpoint 2D image data $U_{L1}$ for a left eye and second viewpoint 2D image data $U_{L2}$ for a left eye, to be provided to left and right sides of a pupil of the left eye, respectively. The image data with different viewpoints for the right eye may be first viewpoint 2D image data $U_{R1}$ for a right eye and second viewpoint 2D image data $U_{R2}$ for a right eye, to be provided to left and right sides of a pupil of the right eye, respectively.

FIG. 6 illustrates the data sets 602 converted by the data format converter 272 (operation 600). For example, the input data may be converted into the first viewpoint 2D image data $U_{L1}$ for the left eye, the second viewpoint 2D image data $U_{L2}$ for the left eye, the first viewpoint 2D image data $U_{R1}$ for the right eye, and the second viewpoint 2D image data $U_{R2}$ for the right eye, but this is not limited thereto, and the input data may be converted into other appropriate image signals.

However, the raw data input unit 271 and the data format converter 272 may be omitted in the light modulating signal generator 270. For example, four sets of data regarding images having different parallaxes, that is, the first viewpoint 2D image data $U_{L1}$ for the left eye, the second viewpoint 2D image data $U_{L2}$ for the left eye, the first viewpoint 2D image data $U_{R1}$ for the right eye, and the second viewpoint 2D image data $U_{R2}$ for the right eye may be obtained by using two cameras for the left eye and two cameras for the right eye, respectively.

When the viewpoint positions are determined in the viewpoints position determiner 273, a corresponding prism phase is determined by the prism phase determiner 275, in operation 604. For example, a prism phase $\varphi_{L1}$ corresponding to first viewpoint 2D image for a left eye, a prism phase $\varphi_{L2}$ corresponding to a second viewpoint 2D image for a left eye, a prism phase $\varphi_{R1}$ corresponding to a first viewpoint 2D image for a right eye, and a prism phase $\varphi_{R2}$ corresponding to a second viewpoint 2D image for a right eye may be determined. The prism phases may be determined according to a position and a distance of a viewer's pupil. To reduce a calculation amount, all or a part of the prism phases may be stored in a lookup table and be used properly according to the position of the viewer's pupil. Furthermore, an intermediate calculation value for a prism phase calculation may be stored in the lookup table. The prism phase determiner 275 may extract data from the stored lookup table, e.g., from a memory 280, according to the position of the viewer's pupil. The extracted data may be converted into a prism phase mask to be multiplied to each component of the 2D image data by a component-wise method.

The prism phase encoder 276 may respectively impose the prism phases $\varphi_{L1}$, $\varphi_{L2}$, $\varphi_{R1}$, and $\varphi_{R2}$ determined by the prism phase determiner 275 to the plurality of 2D image data sets $U_{L1}$, $U_{L2}$, $U_{R1}$, and $U_{R2}$ with different viewpoints that are output from the data format converter 272 and superpose the 2D image data on which prism phases are respectively imposed, in operation 608.

The operation 608 may be performed to obtain a superposed image data $U_L$ for a left eye and a superposed image data $U_R$ for a right eye as follows:

$$U_L = \sum_j U_{Lj} \exp(i\varphi_{Lj})$$

$$U_R = \sum_j U_{Rj} \exp(i\varphi_{Rj})$$

The superposed image data $U_L$ for a left eye and the superposed image data $U_R$ for a right eye may be quantized to a value corresponding to the number of pixels of the space light modulator 230 and output to the SLM signal generator 277. That is, $U_L+U_R$ matrix has complex numbers which may be expressed as integers, for example, the values between 0 and 255 may be used.

The SLM signal generator 277 may convert the superposed image data formed in the prism phase encoder 276 into signals for the space light modulator. For example, the SLM signal generator 277 may form control signals to be applied to each pixel so that the superposed images are displayed on the space light modulator 230. For example, the superposed image data $U_L$ for the left eye may be converted into a light modulating signal for an odd-numbered frame (operation 610), and the superposed image data $U_R$ for the right eye may be converted into a light modulating signal for an even-numbered frame (operation 612).

The controller 250 may control the space light modulator 230 according to the control signal generated and transmitted from the SLM signal generator 277. The controller 250 may control the space light modulator 230 to modulate light according to the light modulating signal for the odd-numbered frame and the light modulating signal for the even-numbered frame alternately based on a time division method which is known to those skilled in the art. Moreover, the controller 250 may control the backlight unit 200 so that a converging direction of light emitted from the backlight unit 200 may alternately be directed to various pupil positions, that is, a right eye $E_R$ position and a left eye $E_L$ position, analyzed by the eye tracker 290. For example, the controller 250 may control the space light modulator 230 and the backlight unit 200 so that the light emitted from the backlight unit 200 may be incident to the space light modulator 230 while being converged into the right-eye position when a control signal to display the superposed image for the right eye is applied to the space light modulator 230, and the light emitted from the backlight unit 200 may be incident to the space light modulator 230 while being converged into the left-eye position when a control signal to display the superposed image for the left eye is applied to the space light modulator 230.

Figure 7A:
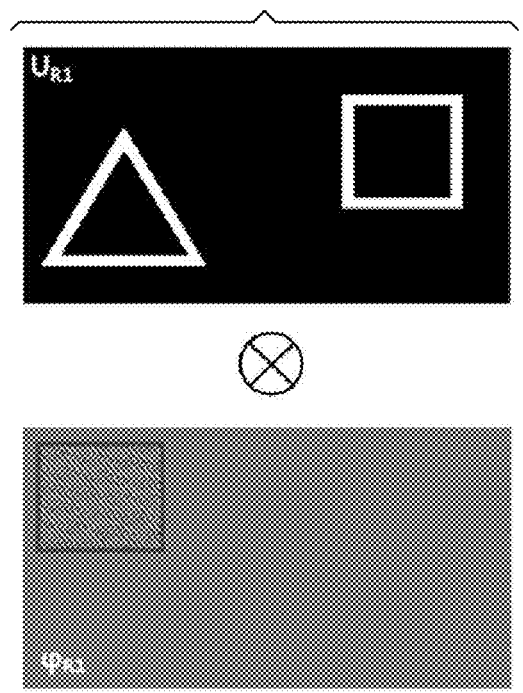
FIGS. 7A, 7B, and 7C are exemplary views of a light modulating signal forming process.
Figure 7B:
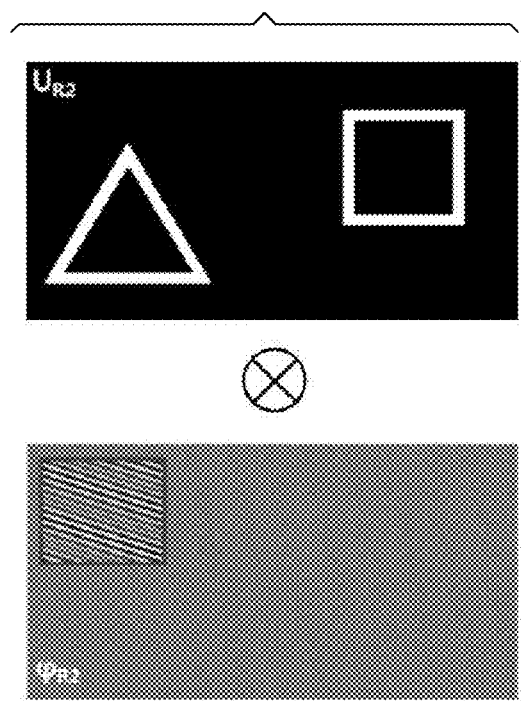
Figure 7C:
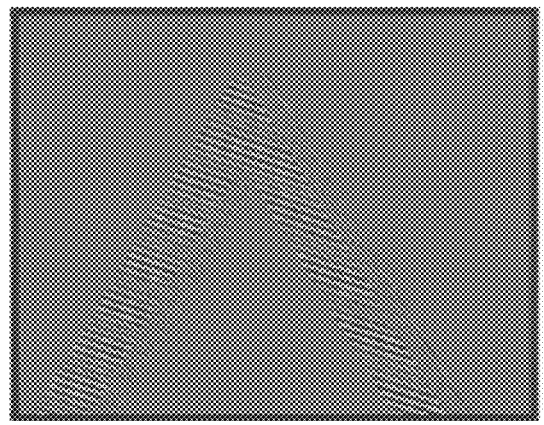

FIGS. 7A to 7C are exemplary views of a light modulating signal forming process in which a plurality of data sets with different viewpoints are respectively imposed with corresponding phase values of each of the viewpoints and the light modulating signal is formed by superposition of the 2D image data on which the phase values are respectively imposed.

FIG. 7A conceptually shows applying a prism phase $\varphi_{R1}$ to a first viewpoint image data $U_{R1}$ for a right eye in the light modulating signal generator 270. The first viewpoint image data $U_{R1}$ for the right eye is for an image to be provided to a left side of a pupil of the right eye, and the prism phase $\varphi_{R1}$ is a phase value makes the first viewpoint image data $U_{R1}$ for the right eye to be directed to the left side of a pupil of the right eye. The prism phase $\varphi_{R1}$ may be prepared in a shape of a prism phase mask. A square displayed on an upper portion of a left side of the prism phase mask is a partial enlarged view and exemplarily illustrates a shape of the prism phase. The prism phase may be added on corresponding position of the first viewpoint image data $U_{R1}$ for the right eye. For example, the first viewpoint image data $U_{R1}$ for the right eye and the prism phase mask may be multiplied to each other, component-wise.

FIG. 7B is a schematic view of applying a prism phase $\varphi_{R2}$ to a second viewpoint image data $U_{R2}$ for a right eye in the light modulating signal generator 270. The second viewpoint image data $U_{R2}$ for the right eye is for an image to be provided to a right side of a pupil of the right eye, and have a predetermined parallax with the first viewpoint image data $U_{R1}$ for the right eye. The prism phase $\varphi_{R2}$ is a phase value makes the second viewpoint image data $U_{R2}$ for the right eye to be directed to the right side of a pupil of the right eye. The prism phase $\varphi_{R2}$ may be prepared in a shape of a prism phase mask. A square displayed on an upper portion of a left side of the prism phase mask is a partial enlarged view which exemplarily illustrates a shape of the prism phase. The prism phase $\varphi_{R2}$ is different from the prism phase $\varphi_{R1}$ corresponding to the first viewpoint image data $U_{R1}$ for the right eye of FIG. 7A. The prism phase may be added on corresponding position of the second viewpoint image data $U_{R2}$ for the right eye. For example, the second viewpoint image data $U_{R2}$ for the right eye and the prism phase mask may be multiplied to each other, component-wise.

FIG. 7C is an enlarged view of a triangle in a superposed image in which the first viewpoint image data $U_{R1}$ for the right eye and the second viewpoint image data $U_{R2}$ for the right eye to which prism phases $\varphi_{R1}$ and $\varphi_{R2}$ are respectively imposed, are superposed and a real part is extracted. For example, FIG. 7C is an enlarged view of an image according to $Re(U_{R1}*exp(i\varphi_{R1})+U_{R2}*exp(i\varphi_{R2}))$. When a control signal is applied to display the superposed image on the space light modulator 230, light is diffracted and modulated from the backlight unit 200, and the first viewpoint image data $U_{R1}$ for the right eye and the second viewpoint image data $U_{R2}$ for the right eye are provided to the left and right sides of the pupil of the right eye, respectively. In FIG. 7C, the square is omitted for convenience.

The similar process may be performed with respect to images with different viewpoints for a left eye.

Figure 8A:
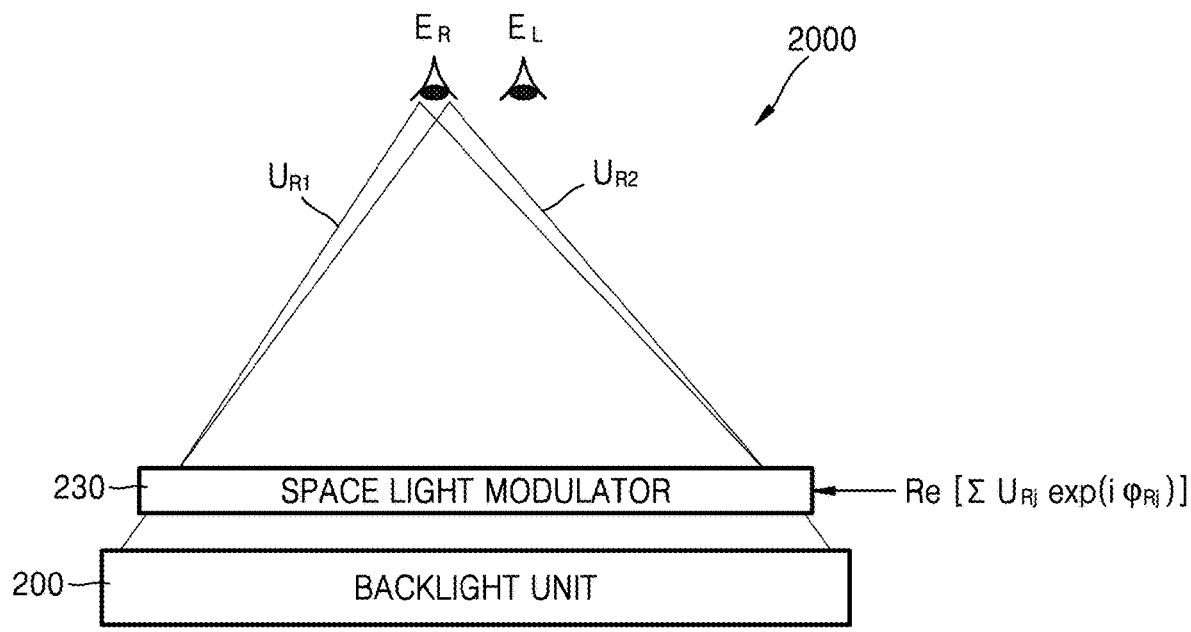
FIGS. 8A and 8B are exemplary views of synchronization of a direction of light output from a backlight unit with a corresponding light modulating signal.
Figure 8B:
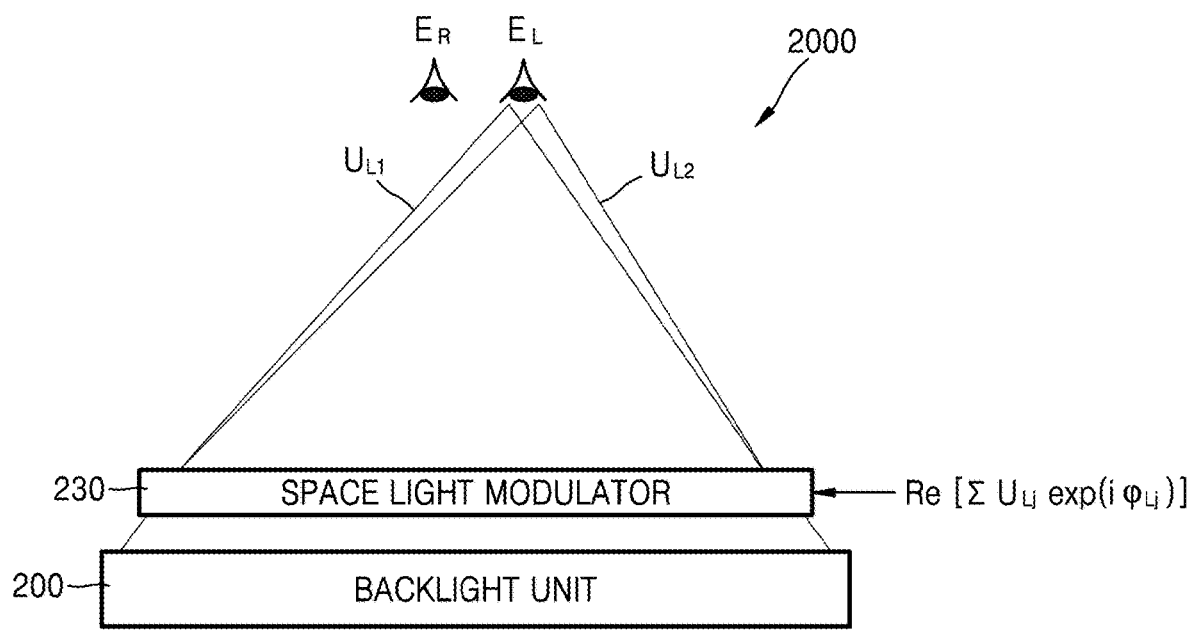

FIGS. 8A and 8B are exemplary views of synchronization of a direction of light output from a backlight unit 200 with a corresponding light modulating signal, and respective recognition of a 3D image in a left eye and a right eye, in the 3D image display apparatus 2000 of FIG. 4.

In FIG. 8A, light in the backlight unit 200 is output and converged toward a viewer's right eye $E_R$, and in accordance with the light described above, a light modulating signal displaying a superposed image for a right eye, that is, $$\sum_j U_{Rj} \exp(i\varphi_{Rj})$$

may be input to the space light modulator 230. FIG. 8A exemplarily illustrates that a control signal to the space light modulator 230 is calculated by taking a real part of $$\sum_j U_{Rj} \exp(i\varphi_{Rj})$$

on the assumption that the space light modulator 230 is an amplitude modulation type, but an exemplary embodiment is not limited thereto. The light emitted from the backlight unit 200 in the converging direction into the viewer's right eye $E_R$ and entered the space light modulator 230 may be diffracted and separated according to the control signal applied to the space light modulator 230. Thus, a first viewpoint image data $U_{R1}$ for a right eye and a second viewpoint image data $U_{R2}$ for a right eye may be steered to left and right sides of a pupil of the right eye $E_R$, respectively.

In FIG. 8B, light in the backlight unit 200 is output and converged toward a converging direction into a viewer's left eye $E_L$, and a light modulating signal displaying a superposed image for a left eye, that is, $$\sum_j U_{Lj} \exp(i\varphi_{Lj})$$

may be input to the space light modulator 230. FIG. 8B exemplarily illustrates that a control signal to the space light modulator 230 is calculated by taking a real part of $$\sum_j U_{Lj} \exp(i\varphi_{Lj})$$

on the assumption that the space light modulator 230 is an amplitude modulation type, but an exemplary embodiment is not limited thereto. The light emitted from the backlight unit 200 in the converging direction into the viewer's left eye $E_L$ and entered the space light modulator 230 may be diffracted and separated according to the control signal applied to the space light modulator 230. Thus, a first viewpoint image data $U_{L1}$ for a left eye and a second viewpoint image data $U_{L2}$ for a left eye may be steered to the left and right sides of a pupil of the left eye $E_L$, respectively.

As described above, images having different parallaxes may be provided by multiple wave-fronts to the viewer's eyes, and the images may be recognized by the viewer as a 3D image. The 3D image is not recognized by a binocular parallax method, that is, a parallax between the left eye and the right eye but recognized by parallaxes which are respectively provided to the both eyes. Thus, there is no vergence-accommodation conflict which may occur when the 3D image is displayed by a binocular parallax method. Furthermore, as each of the wave-fronts is displayed on the space light modulator 230 as a superposed image, the entire resolution of the space light modulator 230 may be used and the resolution is not reduced even if the number of viewpoints is increased. Furthermore, the amount of data processing may be decreased compared to that of the holography method.

Figure 9:
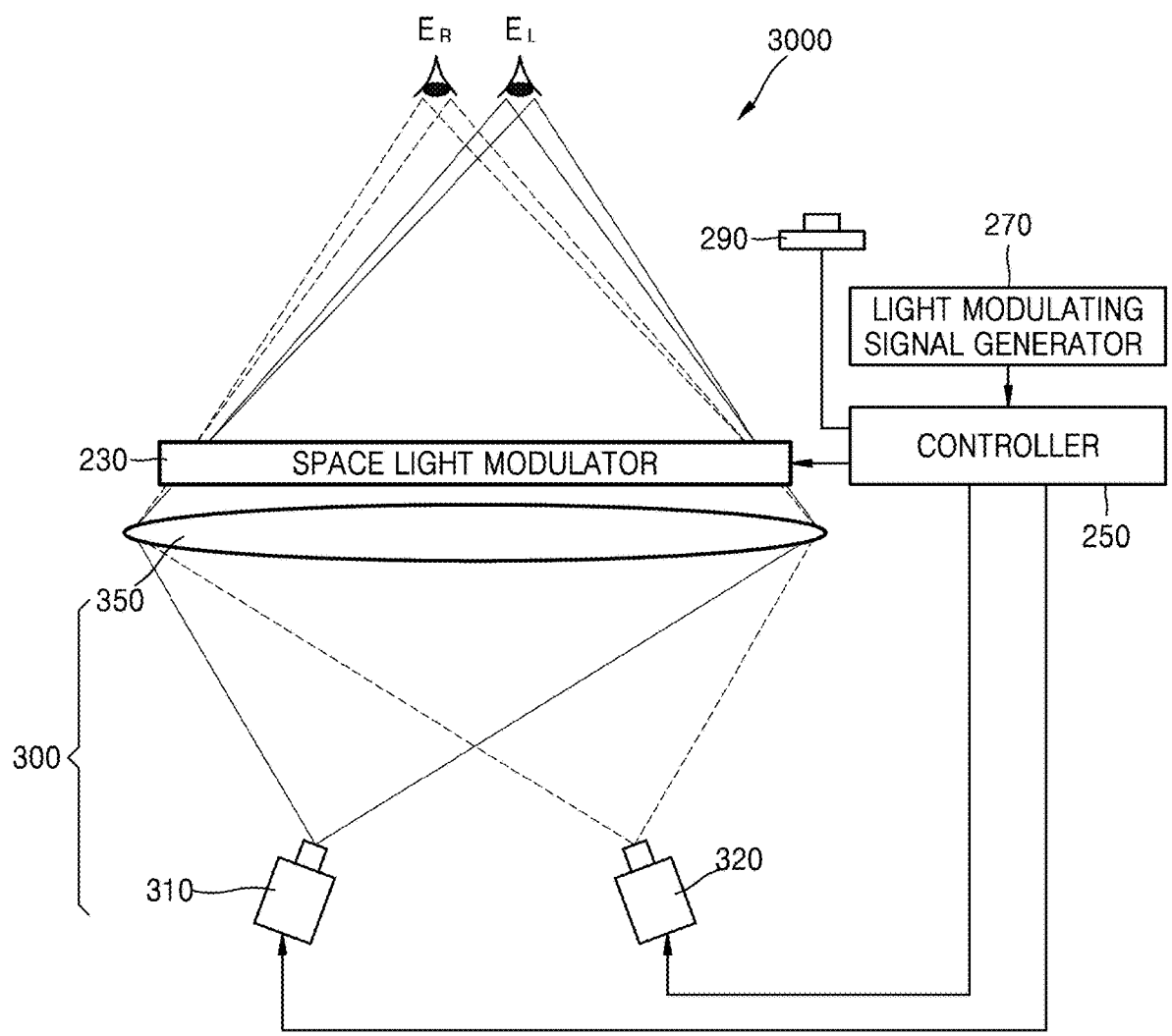
FIG. 9 is a sectional view of a schematic structure of a 3D image display apparatus according to an exemplary embodiment.

FIG. 9 is a sectional view of a schematic structure of a 3D image display apparatus 3000 according to an exemplary embodiment.

The 3D image display apparatus 3000 may include a backlight unit 300, a space light modulator 230, an eye tracker 290, a light modulating signal generator 270, and a controller 250.

The backlight unit 300 may output light in different directions and include first and second light sources 310 and 320 configured to adjust an output direction, and an optical lens 350 converging the light output from the first and second light sources 310 and 320.

The first and second light sources 310 and 320 may provide a coherent light and include at least one of a laser light source and an LED as a light source having spatial coherence. In addition, a pin hole capable of improving spatial coherence may be used.

The optical lens 350 may be disposed between the first and second light sources 310 and 320 and the space light modulator 230, and thus light from the first light source 310 may incident on the space light modulator 230 in a converging direction into a left eye $E_L$, and light from the second light source 320 may incident on the space light modulator 230 in a converging direction into a right eye $E_R$.

The optical lens 350 may have various forms capable of achieving the above function. For example, the optical lens 350 is illustrated as a single lens, but is not limited thereto, and may include a plurality of lenses. In FIG. 9, the optical lens 350 is disposed in a position in which a traveling path of light in the first light source 310 and a traveling path of light in the second light source 320 are overlapped, but is not limited thereto. The optical lens 350 may be respectively disposed on the traveling path of light in the first light source 310 and the traveling path of light in the second light source 320. Furthermore, when lights from the first and second light sources 310 and 320 are emitted as convergent light, the optical lens 350 may be omitted.

The controller 250 may adjust light emitting directions from the first and second light sources 310 and 320 according to position information about the left eye $E_L$ and the right eye $E_R$ analyzed by the eye tracker 290. The controller 250 may synchronize superposed image signals for a left eye and for a right eye that are transmitted from the light modulating signal generator 270 with the turning on/off of the first and second light sources 310 and 320. For example, the controller 250 may control the first and second light sources 310 and 320, so that light may be emitted from the first light source 310 and is not emitted from the second light source 320 when the superposed image signals for the left eye are applied to the space light modulator 230, and light may be emitted from the second light source 320 and is not emitted from the first light source 310 when the superposed image signals for the right eye are applied to the space light modulator 230.

Figure 10:
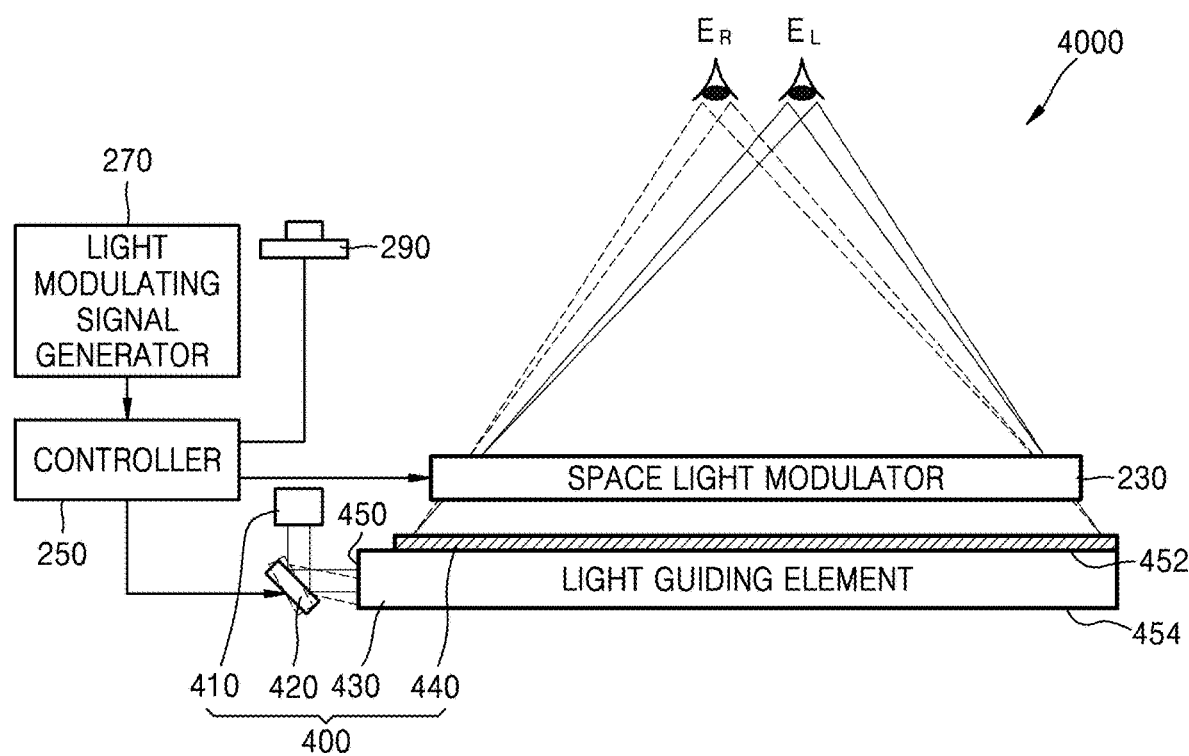
FIG. 10 is a sectional view of a schematic structure of a 3D image display apparatus according to an exemplary embodiment.

FIG. 10 is a sectional view of a schematic structure of a 3D image display apparatus according to an exemplary embodiment.

The 3D image display apparatus 4000 may include a backlight unit 400, a space light modulator 230, an eye tracker 290, a light modulating signal generator 270, and a controller 250.

The backlight unit 400 may include a light source 410, a light guiding member 430, and a beam steering element 420 adjusting an incident angle to the light guiding member 430 from the light source 410.

The light source 410 provides a coherent light and may include at least one of a laser light source and an LED as a light source having spatial coherence. Furthermore, a configuration such as a pin hole capable of improving spatial coherence may be used.

The light guiding member 430 may have a configuration in which light incident the incident surface 450 travels in the light guiding member 430 by total reflection and is emitted from an upper surface 452, i.e., a first surface. A surface of the light guiding member 430 may have an element by which total reflection condition is broken and the light traveling inside the light guiding member 430 can be emitted. For example, an output pattern emitting the incident light from the light guiding member 430 may be formed on the upper surface or a lower surface 454, i.e., a second surface, of the light guiding member 430.

The backlight unit 400 may further include at least one optical element to converge light. In an exemplary embodiment, a hologram optical element 440 is disposed on the upper surface of the light guiding member 430 so that light incident to the light guiding member 430 may be emitted from the light guiding member 430 as convergent light. For example, the hologram optical element 440 may have a hologram pattern for emitting and converging light.

Another hologram optical element (not shown) may further be formed in the side of the light guiding member 430, that is, the incident surface 450 on which light is incident from the light source 410. The hologram optical element may have a hologram pattern, e.g., for a function capable of improving uniformity by changing a condition from an incident light to light capable of being coupled to the light guiding member 430 and by uniformly extending the light.

The beam steering element 420 may adjust a light incident angle on the incident flight guiding member 430 so that light emitted from the backlight unit 400 may be converged in the position of the right eye $E_R$ or the left eye $E_L$.

The beam steering element 420 may have a reflecting surface which is rotationally driven, and may be, for example, a galvanometer mirror or a polygon mirror. As another example, the beam steering element 420 may be an electrowetting element or a grating element as a variable optical element in which a direction of the reflecting surface is electrically controlled.

The controller 250 may control an operation of the beam steering element 420 so that a light emitting direction from the backlight unit 400 may be adjusted according to position information about the left eye $E_L$ and the right eye $E_R$ analyzed by the eye tracker 290. The controller 250 may synchronize superposed image signals for a left eye and for a right eye that are transmitted from the light modulating signal generator 270 with a direction of the beam steering element 420. For example, the controller 250 may control the beam steering element 420, so that the direction of the beam steering element 420 may be adjusted to converge the light emitted from the backlight unit 400 to the left eye $E_L$ position when the superposed image signals for the left eye are applied to the space light modulator 230, and to converge the light emitted from the backlight unit 400 to the right eye $E_R$ position when the superposed image signals for the right eye are applied to the space light modulator 230.

Figure 11:
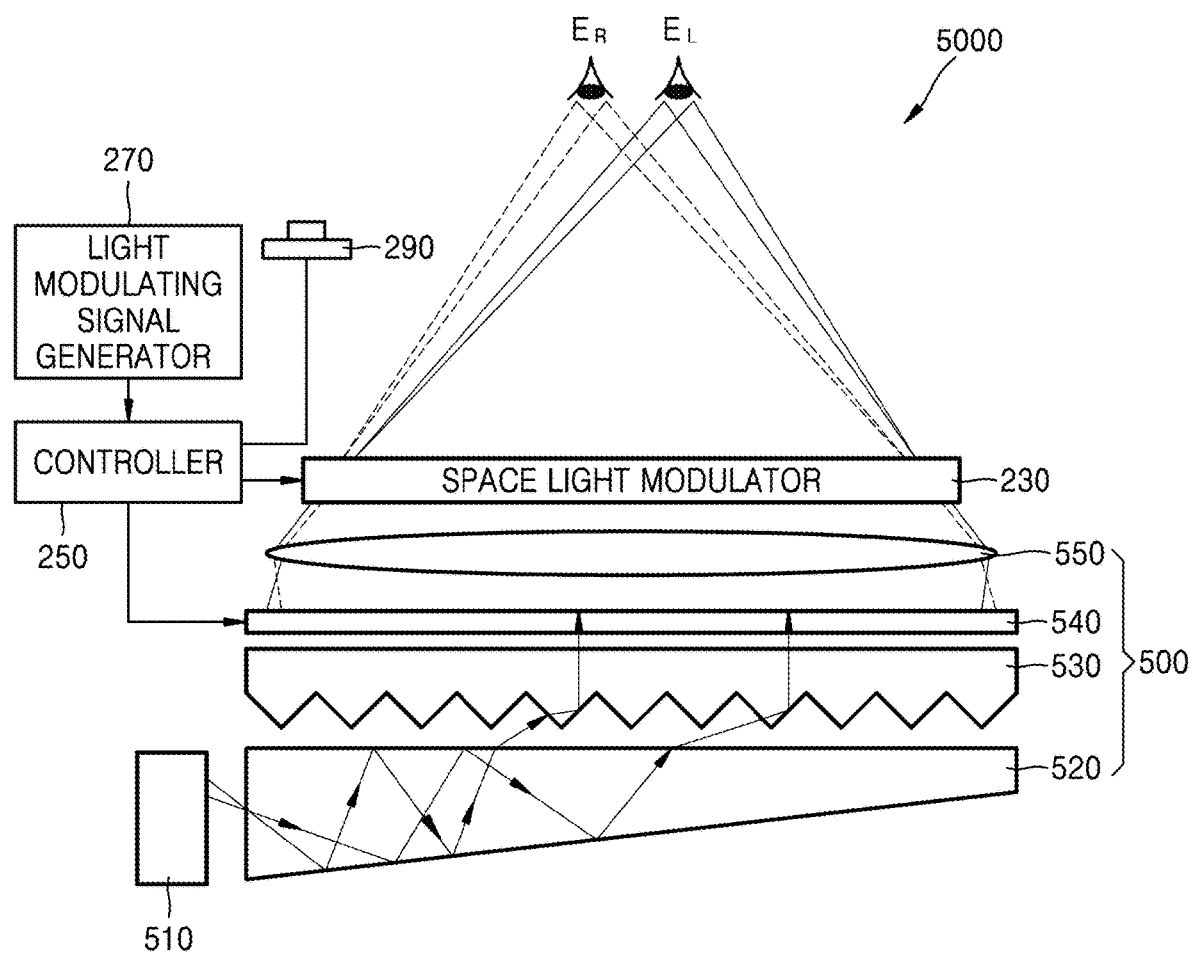
FIG. 11 is a sectional view of a schematic structure of a 3D image display apparatus according to an exemplary embodiment.

FIG. 11 is a sectional view of a schematic structure of a 3D image display apparatus 5000 according to an exemplary embodiment.

The 3D image display apparatus 5000 may include a backlight unit 500, a space light modulator 230, an eye tracker 290, a light modulating signal generator 270, and a controller 250.

The backlight unit 500 may include a light source 510, a light guiding member 520, an inverted-prism sheet 530, a variable optical element 540, and an optical lens 550.

The light source 510 provides a coherent light and may include at least one of a laser light source and an LED as a light source of spatial coherence. In addition, a pin hole capable of improving spatial coherence may be used.

The light guiding member 520 is wedge shaped and a distance between upper and lower surfaces of the light guiding member 520 is narrower farther away from the light source unit 510. For example, the light guiding member 520 may be thinner farther away from the light source unit 510.

The inverted-prism sheet 530 may be formed to collimate light emitted from the light guiding member 520 to a parallel light.

The light guiding member 520 in a wedge type and the inverted-prism sheet 530 are an exemplary configuration in which light from the light source 510 is collimated and emitted, and may be changed to another component capable of providing the collimated light.

The variable optical element 540 is an optical element capable of converting and emitting an incident light direction, that is, an optical element capable of controlling a light refraction direction. For example, the variable optical element 540 may be an electrowetting element electrically controlling a boundary surface of two media having different refractive index from each other and also electrically controlling the direction along which the incident light is refracted and emitted.

The optical lens 550 is for converging light and may include a plurality of lenses even though one lens is illustrated as the optical lens 550 in FIG. 11. Furthermore, FIG. 11 illustrates a biconvex lens, but the optical lens 550 is not limited thereto, and a Fresnel lens may also be used.

The direction of the incident light to the variable optical element 540 may be adjusted according to an operation of the optical lens 550, and the optical lens 550 may converge the light to a left eye $E_L$ or a right eye $E_R$.

The controller 250 may control the operation of the variable optical element 540 so that a light emitting direction from the backlight unit 500 according to information about the left eye $E_L$ position or the right eye $E_R$ position determined by the eye tracker 290. The controller 250 may synchronize superposed image signals for a left eye and for a right eye that are generated and transmitted from the light modulating signal generator 270 with a refractive surface direction of the variable optical element 540. For example, the controller 250 may control the variable optical element 540, so that the variable optical element 540 may be operated to converge the light emitted from the backlight unit 500 to the left eye $E_L$ position when the superposed image signals for the left eye are applied to the space light modulator 230, and to converge the light emitted from the backlight unit 500 to the right eye $E_R$ position when the superposed image signals for the right eye are applied to the space light modulator 230.

Figure 12:
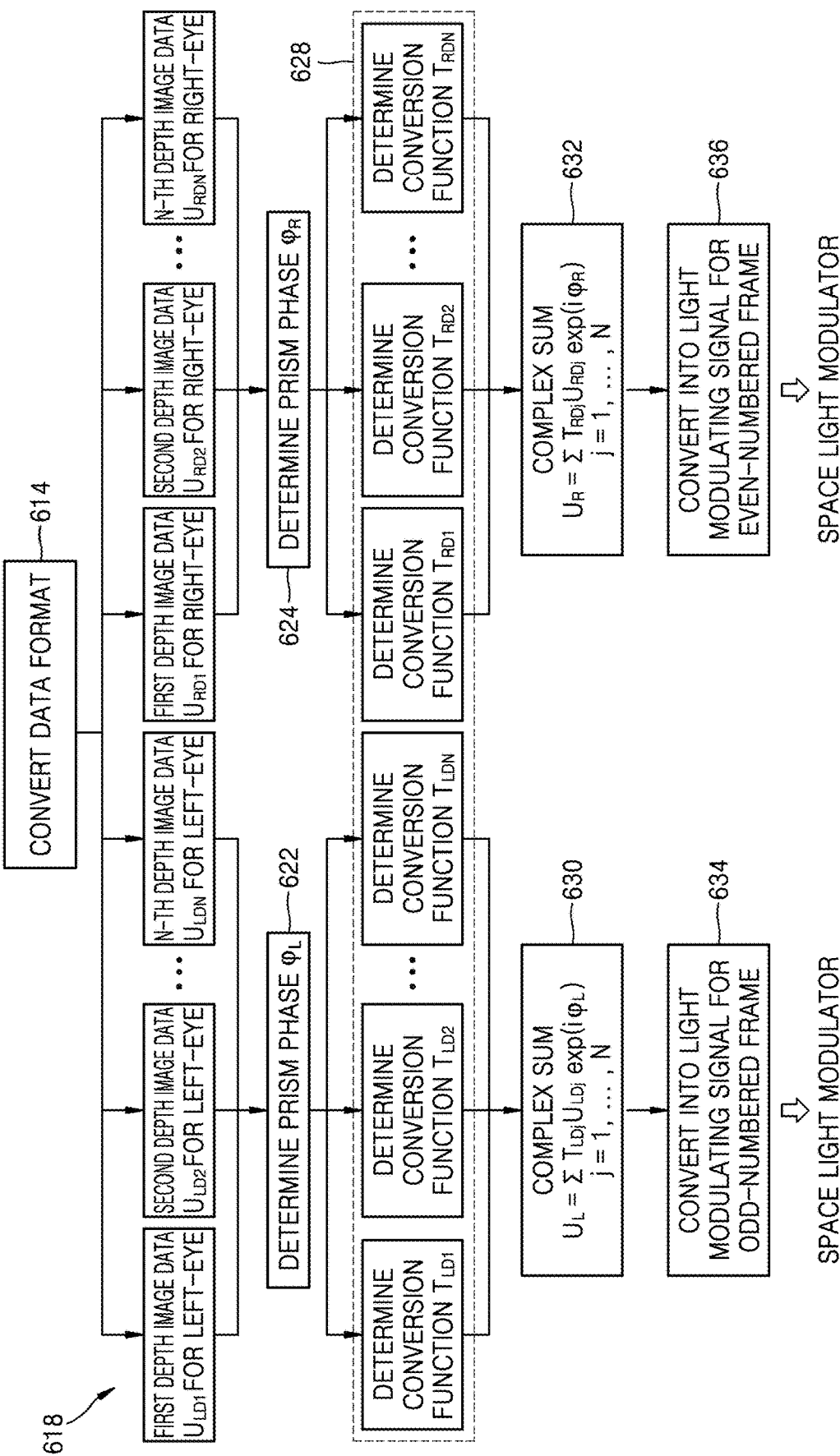
FIG. 12 is a flow chart schematically illustrating a process of forming a light modulating signal according to an exemplary embodiment.
Figure 13:
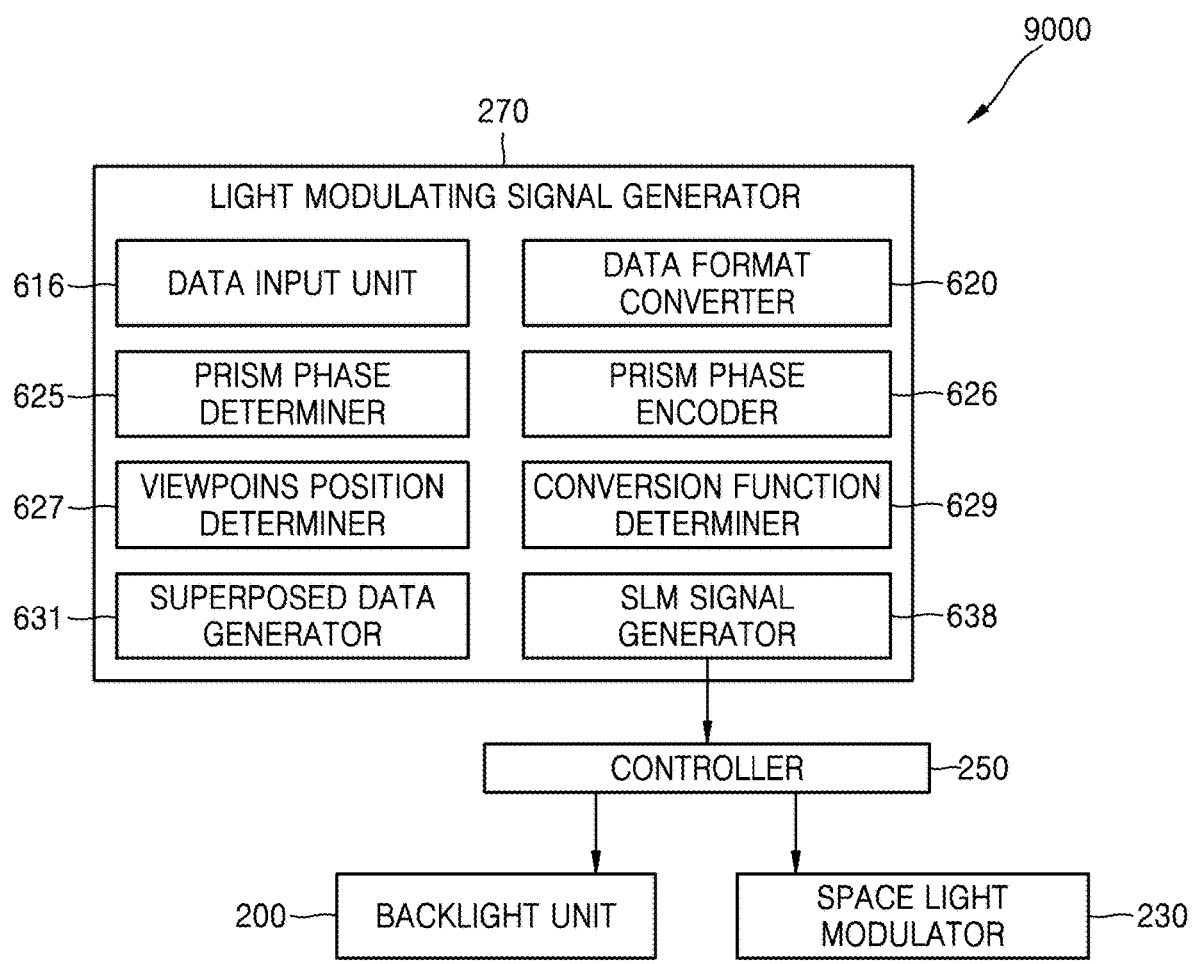
FIG. 13 is a block diagram of a schematic structure of the 3D image display apparatus according to an exemplary embodiment.

FIG. 12 is a flow chart schematically illustrating a process of forming a light modulating signal to be provided toward a space light modulator in a light modulating signal generator 270 according to an exemplary embodiment. FIG. 13 is a block diagram of a schematic structure of the 3D image display apparatus 9000.

The 3D image display apparatus 9000 may include a display panel 198, a backlight unit 200, the space light modulator 230, an eye tracker 290, the light modulating signal generator 270, and a controller 250 which are described in detail above with reference to FIGS. 5 and 6. The light modulating signal generator 270 includes a data input unit 616, a viewpoints position determiner 627, a prism phase determiner 625, a data format converter 620, a prism phase encoder 626, and an SLM signal generator 638 which have functions similar to those of the corresponding components described above with reference to FIGS. 5 and 6 and, thus, repeated descriptions will be omitted.

As described above, according to exemplary embodiments, the light modulating signal generator 270 converts raw data of various formats into 2D images with different viewpoints, imposes a prism phase to the 2D images, and forms superposed images by superposition of the 2D images on which the prism phases are respectively imposed.

With reference to FIGS. 12 and 13, in the present exemplary embodiment, in operation 614, to form superposed image data, 3D image data having a color-depth data format which is input into the data input unit 616, is converted into a plurality of depth images, e.g., image data 618, with different depth cues, by a depth data format converter 620.

The depth image data may be a first depth image data $U_{LD1}$ for a left eye and a second depth image data $U_{LD2}$ for a left eye to an Nth depth image data $U_{LDN}$ for a left eye; and a first depth image data $U_{RD1}$ for a right eye and a second depth image data $U_{RD2}$ for a right eye to an Nth depth image data $U_{RDN}$ for a right eye.

In operations 622 and 624, corresponding to each of the depth image data sets, the prism phase by which the 2D images are seen from a position of a viewer's pupil may be determined, respectively, by a prism phase determiner 625. Further, prism phase $\varphi_L$ may be applied to the depth image data for a left eye, and prism phase $\varphi_R$ may be applied to the depth image data for a right eye, by a prism phase encoder 626.

Before superposing the depth images on which the prism phases are imposed, the depth images are converted to images with different viewpoints, as determined by a viewpoints position determiner 627. In operation 628, a conversion function to be applied to each of the depth image signals may be determined, by a conversion function determiner 629.

For example, conversion functions $T_{LD1}$ and $T_{LD2}$ to $T_{LDN}$ for the left eye, and conversion functions $T_{RD1}$ and $T_{RD2}$ to $T_{RDN}$ for the right eye may be determined for the first depth image data $U_{LD1}$ for the left eye to the Nth depth image data $U_{LDN}$ for the left eye, respectively, and for the first depth image data $U_{LD1}$ for the right eye to the Nth depth image data $U_{LDN}$ for the right eye, respectively.

Next, to the depth image data $U_{LDj}$ for a left eye on which prism phase $\varphi_L$ is imposed, the conversion functions $T_{LDj}$ are respectively applied, and, to the depth image data $U_{RDj}$ for a right eye on which prism phase $\varphi_R$ is imposed, the conversion functions $T_{RDj}$ are respectively applied. For example, the conversion functions may be applied by the conversion function determiner 629.

In operation 630, superposition is performed to calculate superposed image data $U_L$ for left eye, by a superposed data generator 631, as follows:

$$U_L = \sum_j T_{LDj} U_{LDj} \exp(i\varphi_{LDj})$$

Also, in operation 632, superposition is performed to calculate superposed image data $U_R$ for left eye as follows:

$$U_R = \sum_j T_{RDj} U_{RDj} \exp(i\varphi_{RDj})$$

A superposed image data $U_L$ for a left eye and a superposed image data $U_R$ for a right eye may be respectively converted into a light modulating signal for an odd-numbered frame (operation 634) and a light modulating signal for an even-numbered frame (operation 636), by an SLM signal generator 638, and applied to the space light modulator.

In an exemplary embodiment, some of the components of the light modulating signal generator 270 may be omitted and the operations described above may be performed by a single component having one or more processors. For example, operations 622, 624, 628, 630, and 632 may be performed by the superposed data generator 631 having one or more processors, but this is not limiting.

Such a method of a light modulating signal generation for displaying a 3D image may be applied to the 3D image display apparatuses of exemplary embodiments described above.

According to the method of the light modulating signal generation for displaying the 3D image, a light modulating signal for displaying a 3D image, which has a higher resolution compared to a super multi-view display and requires less processing compared to a holographic display, may be formed.

A 3D image display apparatus adapting the above method may be realized by a simple configuration including a backlight unit and a space light modulator, and may provide a 3D image substantially reducing or eliminating fatigue of a viewer.

According to exemplary embodiments, the use of the parallax barrier and a lenticular lens may be avoided by using coherent light and prism phase which is imposed on directional image. Coherent light is interfered by prism phase, which is imposed on directional image, and, then, the interfered light is directed to a corresponding viewpoint.

The 3D image display apparatus may be applied to a variety of electronic devices, for example, a monitor, a TV, a mobile display apparatus, or a mobile communication device.

Exemplary embodiments can be written as computer programs and can be implemented in computers that execute the programs using a computer-readable recording medium.

Examples of the computer-readable recording medium include magnetic storage media (e.g., ROM, floppy disks, hard disks, etc.), optical recording media (e.g., CD-ROMs, or DVDs), etc.

The foregoing exemplary embodiments and advantages are merely exemplary and are not to be construed as limiting. The present teaching may be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method of forming a light modulating signal for displaying a three-dimensional (3D) image, the method comprising:
   preparing a plurality of data sets corresponding to two-dimensional (2D) images with different viewpoints, the different viewpoints being spaced apart in a direction orthogonal to a depth direction;
   determining a phase value for each of the 2D images as a prism phase, wherein the prism phase of each of the 2D images determines a direction in which each of the 2D images is to be directed, respectively, from a space light modulator to be seen at a corresponding viewpoint among the different viewpoints, and wherein the phase value for each of the 2D images is configured so that at least two 2D images with the different viewpoints spaced apart in the direction orthogonal to the depth direction are provided in one pupil of a viewer;
   imposing the phase value to the plurality of data sets, respectively, and superposing the plurality of data sets on which the phase value has been imposed, to obtain superposed image data as a complex function; and
   converting an output value of the complex function into the light modulating signal for the space light modulator,
   wherein the determining the phase value comprises determining the phase value of each of the 2D images with respect to each corresponding viewpoint based on a distance between the space light modulator and each corresponding viewpoint, respectively, and
   wherein each of the 2D images is output from the space light modulator as a directional image with a focus at the corresponding viewpoint in the one pupil of the viewer.

2. The method of claim 1, wherein the preparing the plurality of data sets comprises converting format of input 3D image data.

3. The method of claim 1, wherein the preparing the plurality of data sets comprises capturing the 2D images with the different viewpoints by using cameras.

4. The method of claim 2, wherein the preparing the plurality of data sets further comprises converting light field data.

5. The method of claim 1, wherein the determining the phase value further comprises determining the phase value based on data calculated and stored in advance with respect to various positions of the one pupil of the viewer.

6. A displaying method of displaying a 3D image, the displaying method comprising:
   emitting a convergent coherent light toward the space light modulator;
   forming the light modulating signal for displaying the 3D image by using the method of claim 1; and
   modulating light incident to the space light modulator according to the light modulating signal.

7. The displaying method of claim 6, wherein the preparing the plurality of data sets comprises converting a format of input 3D image data.

8. The displaying method of claim 6, wherein the preparing the plurality of data sets comprises capturing the 2D images with the different viewpoints by using cameras.

9. The displaying method of claim 6, wherein the preparing the plurality of data sets comprises converting light field data.

10. The displaying method of claim 6, further comprising:
    performing an eye tracking configured to sense a position of the one pupil of the viewer.

11. The displaying method of claim 10, wherein the determining the phase value further comprises determining the phase value based on data calculated and stored in advance with respect to various positions of the one pupil of the viewer.

12. The displaying method of claim 10, wherein the emitting the convergent coherent light comprises adjusting a direction along which light is emitted such that the light is converged toward the sensed position of the one pupil of the viewer.

13. The displaying method of claim 10, wherein the performing the eye tracking comprises sensing positions of a left eye and a right eye of the viewer, respectively, and
    the emitting the convergent coherent light comprises adjusting a direction along which light is emitted such that the light is converged toward the left eye and the right eye of the viewer, respectively, based on a time division method,
    wherein the one pupil of the viewer is included in one of the left eye and the right eye.

14. A method of forming a light modulating signal for displaying a three-dimensional (3D) image, the method comprising:
    preparing a plurality of data sets corresponding to two-dimensional (2D) depth images with different depth cues;
    imposing a phase value to each of the plurality of data sets as a prism phase, wherein the prism phase of each of the plurality of data sets determines a direction in which each of the 2D depth images is to be directed, respectively, from a space light modulator to different viewpoints spaced apart in a direction orthogonal to a depth direction, to be seen at a certain position in a viewer's pupil, of a plurality of positions;

determining a conversion function by which the 2D depth images are converted to 2D image with the different viewpoints, wherein the conversion function is configured so that at least two 2D images with the different viewpoints spaced apart in the direction orthogonal to the depth direction are provided in one pupil of a viewer;

applying the conversion function to the plurality of data sets;

superposing the plurality of data sets to which the conversion function has been applied; and converting a complex function value obtained from the superposing into the light modulating signal for the space light modulator, wherein the determining the phase value comprises determining the phase value of each of the 2D images with respect to each corresponding viewpoint among the different viewpoints based on a distance between the space light modulator and each corresponding viewpoint, respectively, and wherein each of the 2D images is output from the space light modulator as a directional image with a focus at the corresponding viewpoint in the one pupil of the viewer.

15. An apparatus for displaying a 3D image, the apparatus including:

a backlight unit configured to emit light as a convergent coherent light;

the space light modulator configured to modulate the light emitted from the backlight unit;

a light modulating signal generator configured to generate the light modulating signal for displaying a 3D image according to the method of claim 1; and a controller configured to control the space light modulator according to the light modulating signal.

16. The apparatus of claim 15, further including:

an eye tracker configured to sense positions of a left eye and a right eye of the viewer, respectively, wherein the one pupil is included in one of the left eye and the right eye.

17. The apparatus of claim 16, wherein a converging direction of the light emitted from the backlight unit is adjusted according to the positions of the left eye and the right eye of the viewer, respectively.

18. The apparatus of claim 17, wherein the light modulating signal generator is further configured to generate the light modulating signal for odd-numbered frames and the light modulating signal for even-numbered frames, and the controller is further configured to control the space light modulator to modulate the light according to the light modulating signal for the odd-numbered frames and the light modulating signal for the even-numbered frames based on a time division method, and to control the backlight unit such that the light output from the backlight unit is converged toward the left eye and the right eye of the viewer, respectively, in synchronization with the space light modulator.

19. The apparatus of claim 17, wherein the backlight unit includes:

a first light source and a second light source that are configured to output the light in different directions and adjust output directions; and an optical lens configured to converge the light output from the first light source and the second light source.

20. The apparatus of claim 17, wherein the backlight unit includes:

a light source;

a light guiding member including an incident surface on which the light emitted from the light source is incident, a first surface which is adjacent the incident surface and from which the light is emitted, and a second surface opposing the first surface;

at least one optical element configured to converge the light emitted from the light guiding member; and a beam steering element disposed between the light source and the incident surface of the light guiding member and configured to adjust an angle at which the light emitted from the light source is incident on the incident surface.

21. The apparatus of claim 20, wherein an output pattern configured to emit the light from the light guiding member is formed on the first surface or the second surface of the light guiding member.

22. The apparatus of claim 20, wherein the at least one optical element includes a hologram optical element disposed on the first surface of the light guiding member and configured to emit the light incident on the light guiding member as a convergent light.

23. The apparatus of claim 20, wherein the light guiding member is a wedge shaped element in which a distance between the first surface and the second surface becomes smaller as a distance from the light source becomes greater, and the apparatus further includes:

an inverted-prism sheet disposed on the first surface;

a variable optical element disposed on the inverted-prism sheet; and an optical lens disposed on the variable optical element.

24. The apparatus of claim 15, wherein the space light modulator is an amplitude modulation space light modulator; and the controller is further configured to generate the light modulating signal by using a real part of a complex function value.

25. A non-transitory computer-readable storage medium having recorded thereon software instructions which, when executed by a computer system, cause the computer system to execute the method of claim 1.

26. A method comprising:

obtaining data sets corresponding to two-dimensional (2D) images having different viewpoints spaced apart in a direction orthogonal to a depth direction, in each of eyes of a viewer;

determining phase values for each of the 2D images as the phase values of a prism phase, wherein the prism phase of each of the 2D images determines a direction in which each of the 2D images is to be directed, respectively, from a space light modulator to be seen at a corresponding viewpoint among the different viewpoints, the phase values for each of the 2D images being configured so that at least two 2D images with the different viewpoints spaced apart in the direction orthogonal to the depth direction are provided in one pupil of the viewer;

applying the phase values to the data sets, respectively;

calculating a complex function value by superposing the data sets to which the phase values have been applied;

converting the complex function value into a light modulating signal for the space light modulator;

modulating light emitted from a backlight unit based on the light modulating signal; and displaying the 2D images directed to the different viewpoints in each of the eyes of the viewer by using the modulated light, thereby performing a display of a three-dimensional image as seen by the viewer, wherein the determining the phase values comprises determining a phase value of each of the 2D images with respect to each corresponding viewpoint based on a distance between the space light modulator and each corresponding viewpoint, respectively, and wherein each of the 2D images is output from the space light modulator as a directional image with a focus at the corresponding viewpoint in the one pupil of the viewer.

27. The method of claim 26, further comprising:

sensing positions of pupils of the eyes of the viewer; and determining locations of the different viewpoints in the pupils based on the sensed positions of the pupils.

28. The method of claim 27, wherein the phase values configured to adjust light directions in which respective 2D images are directed to be seen at corresponding viewpoints in the pupils of the viewer.

29. The method of claim 1, further comprising forming images focused on the different viewpoints, respectively, in the one pupil of the viewer, each of the images including a combination of the plurality of data sets, each of the plurality of data sets having been imposed the phase value, respectively, prior to performing the superposing.

* * * * *